United States Patent [19]

Malestein

[11] Patent Number: 4,697,547
[45] Date of Patent: Oct. 6, 1987

[54] APPARATUS AND METHOD FOR REARING AND/OR KEEPING ANIMALS

[76] Inventor: Teus Malestein, 3771 VC Barneveld, Stationsweg 49, Netherlands

[21] Appl. No.: 786,086

[22] Filed: Oct. 10, 1985

[30] Foreign Application Priority Data

Oct. 16, 1984 [NL] Netherlands .......................... 8403158

[51] Int. Cl.⁴ ............................................. A01K 31/00
[52] U.S. Cl. ........................................ 119/18; 119/15; 119/17
[58] Field of Search ..................... 119/17, 18, 22, 48, 119/15

[56] References Cited

U.S. PATENT DOCUMENTS

| | | | |
|---|---|---|---|
| 2,302,314 | 11/1942 | Haggart | 119/18 X |
| 3,319,606 | 5/1967 | Virgil | 119/48 X |
| 3,465,722 | 9/1969 | Duff | 119/18 |
| 3,903,851 | 9/1975 | Van Huis | 119/18 |
| 3,994,260 | 11/1976 | Fleshman | 119/17 |
| 4,020,793 | 5/1977 | Morrison | 119/18 |
| 4,528,941 | 7/1985 | Spengler | 119/15 |

FOREIGN PATENT DOCUMENTS

978037 of 0000 Canada.
2258126 of 0000 France.
1543184 of 0000 France.

OTHER PUBLICATIONS

Landtechnik, vol. 34, No. 3, Maart 1979, blz. 142–144; S. Scholtyssek: "Technischer Stand der Junggeflugelmast", *Figuur 3*.

*Primary Examiner*—John J. Wilson
*Attorney, Agent, or Firm*—Larson and Taylor

[57] ABSTRACT

An animal rearing apparatus having removable cage sets (1,3,4) with a free space between cages laying above each other, and a service system 5 having fodder and water supply means (6–13, 16–23) and supports (25,26) for manure disposal belts, preferably at both sides. The invention covers as well the cage sets (1,3,4) as the service system (5,6–13, 16–23, 25,26) and a method for rearing animals in which they are transported in the cages in which they have been reared.

14 Claims, 3 Drawing Figures

APPARATUS AND METHOD FOR REARING AND/OR KEEPING ANIMALS

The invention relates to an apparatus and method for rearing and/or keeping animals and a service system and cage set to be used in the apparatus.

An apparatus for rearing and/or keeping animals provided with cages and a service system for supplying food and/or drink for the animals in the cages, said cages and said service system being movable with respect to each other is known from the Canadian Patent Specification No. CA-A-978 037.

With this known apparatus the service system is movable, so that it is difficult to connect it to an automatic food supply. Further no excrement removal means is present, for which reason conditioned air is fed through the cages in order to maintain the moisture level in the manure at a low value.

It is an aim of the invention to improve the known apparatus in such a way, that an automatic food and water supply is made far easier and that removal of excrements or manure is easily possible.

A further disadvantage of known poultry and/or small animals keeping apparatus is, that for transporting the animals, for instance to a slaughter-house, they have to be put in transport cages, which is a rather straining and time consuming activity. Also it may happen in practice, that the animals are wounded, specially when work speed is high, as often has to be the case, because this job, that only by times occurs, in practice is done by temporary rather expensive hands, often working in the evening or at night. This leads to haemmorrhages and/or bruises, which is not only very rejectable in view of well treating the animals, but also lowers their economical value considerably.

A further disadvantage is, that for taking the animals out of the cages (catching) one needs considerable space before the cages, so that a gangway of considerable width is necessary between the cages to get room for the transport cages as well as for the catchers. Here it should be kept in mind that with modern animal rearing plants of the indicated type, such as batteries for poultry installations are involved with a length up till about 100 m.

Still a further disadvantage is that, in addition the rearing cages as the transport cages have to be disinfected.

It is a further aim of the invention to eliminate these disadvantages.

It is remarked that in the article of Prof. Dr. S. Scholtyssek "Technischer Stand der Junggeflügelmast" 583. Landtechnik, Vol. 34, No. 3, March 1979, pages 142-114 has been indicated that keeping broilers and laying-hens in cages theoretically is possible but requires large technical efforts, so that it only could be realized if the cages would be mobile.

Accordingly it is a further aim of the invention to provide an economic cage and foddering apparatus enabling this goal.

According the invention the above indicated aims are in principle realized by providing that between cages positioned above each other a shallow space is left free, covering a front side and two sides adjacent to it of each cage, a belt movable horizontally in the direction of said front side being located in the said space and supported by supporting means mounted to said service system, cages positioned above each other being only joined at the back side of said cages, to form removable sets of cages, said service system being fixedly mounted.

With the invention it is possible to have the food and water supply and the manure disposal means at one side of the cages, to be called the front side, so that the other side, the back side, can be completely free allowing good accessibility and an unhampered sight.

In order to transport the sets of cages more easily, they may be provided with wheels.

According to a further elaboration of the invention it is provided that said service system has a small vertical central frame with two opposing main vertical sides, the said supporting means protruding from both sides for cooperation with a cage set at each side of said frame. This allows for high compactness because it saves one time the width of the service system. Also it gives the additional advantages that the service system and the gutters can be used for two batteries of cages.

According to still a further improvement of the invention it is provided that said service system is provided with a plurality of principally vertical food supply pipes and a horizontal food supply gutter for each cage row located above each other, said pipes being arranged to supply food to each of the gutters, and said gutters being provided with a movable food transport means.

This improvement of the invention is important, because it allows to feed the animals at any desired moment and with any desired food quantity, whereas it remains possible to have a rather narrow service system.

In practice cage batteries were known having stationary food gutters and a movable hopper to supply the gutters with food. Because this is time and labour consuming normally food was supplied a few times a day. This resulted in long boring periods for the animals and as a consequence a feeling of discomfort reducing the profit of the food, because the animals eat too fast and too much when they have waited too long.

Further systems are known having a food transport means in the gutters and only a food supply at one side of the battery. Because food transport in the gutters is relatively slow the animals at the beginning of the gutter will pick out all items they like most and the other animals further down the gutter will either receive adversely selected food or even too little food. A solution for this problem was to supply an excess of food and to have the gutter permanently filled. This solution, however, may result in a higher food consumption than with a rather frequent intermittend supply.

The above indicated improvement of the invention allows to eliminate these difficulties with a rather simple device and to maintain the advantage of the invention of transporting the animals in their cages.

An embodiment of the invention, which is specially suitable for laying-hens, which means the necessity of some distance from the food and of removal means for eggs, exists in that said gutters have tilting side walls and there between a central portion, in which the movable transport means is located, the said supply pipes passing through one tilting side wall of at least the gutters above the lowermost, said supply pipes having an opening connecting them to the related gutter, a product removal belt being located beside the supply pipes.

Preferably herewith it is provided that the floors of the cages are pivotable about an axis located at the back side of the cages. This feature allows the use of the same cage for laying-hens and chickens or broilers.

For chickens or broilers it is normally preferred to provide that said gutters pass through said supply pipes and that the transport means are provided with openings and the gutters have openings at the location of the supply pipes.

It is remarked that the invention also gives important advantages if it is only partly used, for instance if the animals in part of the cage sets are put into other cage sets in order to have a high animal density during the short time of transport, as now is common. The invention then still provides the advantages, that only part of the animals have to be catched, that no transport cages have to be brought to the plant and that when catching more space is available because no transport cages have to be brought into the gangways, whereas also the possibility of easy displacement of the cages allows for the best relative location of the cages when transferring the animals.

It is very well possible to make use of the invention by only using or delivering cage sets or service systems. Consequently the invention covers also these items per se.

Because with the invention the cages themselves have to be transported, it is preferred to give the cages a length that is adapted to the internal width of a truck loading space, for instance half this width, or 120 cm.

Finally the invention covers a method for rearing and/or keeping animals, which is characterized in that the animals are put in a set of cages of the depicted type, which cages are put in cooperative relation to a service system as depicted, the set of cages is transported to a disposal station for the animals, such as a slaughterhouse, the set of cages is cleaned and/or desinfected, the set of cages is brought to a supply of new animals and is filled with them and again put in cooperative relation with a service system of the indicated type.

The method of the invention eliminates two times a transfer of the animals, namely first at the breeding station, in which for poultry normally chickens are filled in boxes for transport to the rearing or keeping apparatus and at the end of the cycle, when the animals are put in transport cages to be carried to a slaughterhouse. Consequently less transport material is necessary or in case of reuse, less desinfection activities. Also considerable less catching is necessary.

In the following the invention is further elucidated on hand of the drawing, in which.

Figure 1:
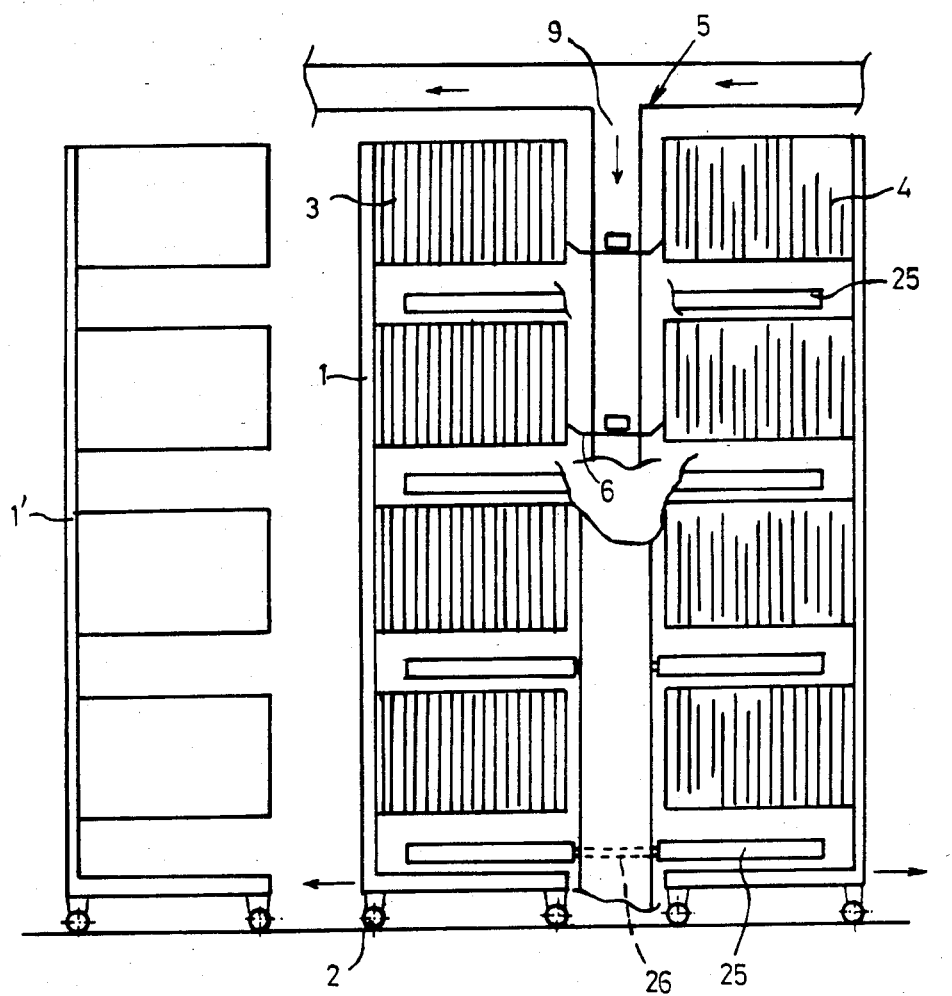
FIG. 1 shows schematically a cross-section through an animal home according to the invention.

In the drawing 1 designates a cage set, which at its lower side is supported by wheels 2 and contains cages 3. This set is ridable, as has been shown schematically in FIG. 1 with the set 1'.

In FIG. 1 two sets of cages have been indicated namely 1 and 4, which each can be shifted in the direction of the indicated arrows and each cooperate with a central service system 5 in a frame.

This service system 5 contains horizontal fodder gutters 6, vertical supply pipes 9 to provide these gutters with fodder, support rolls 25 for manure removal belts, which are rotatably mounted on shafts 26 and in some cases also egg removal bets 17 running on slightly tilting gutters 16.

Figure 2:
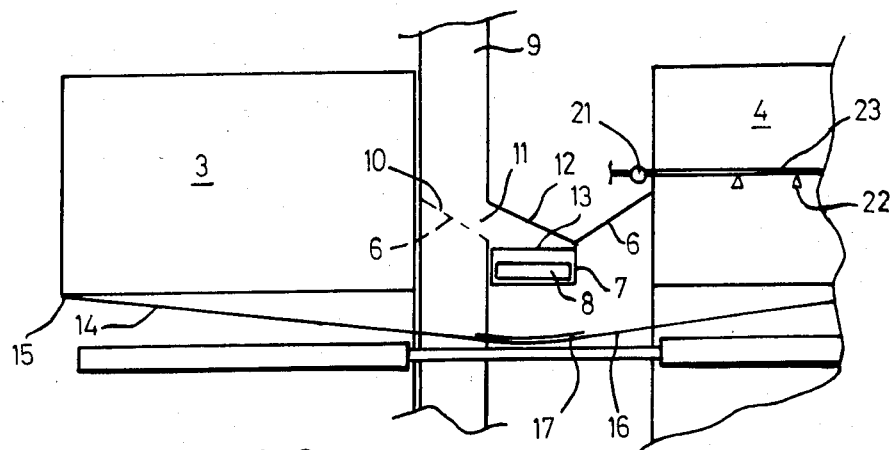
FIG. 2 shows a partial cross-section on a larger scale of an embodiment of the invention.

In FIG. 2 two cages 3 and 4 have been drawn and therewith a fodder gutter, which is of known cross-sectional shape, namely at both sides a tilting portion 6 and in the centre a gutter 7 with rectangular cross-section. In this gutter lies a transport chain 8. Through the left oblique side of the gutter a standing pipe 9 has been passed, which at 10 passes through the tilting portion 6 of the gutter and has a side opening 11. Above the opening 11 a cover 12 is present which at both sides of the standing pipe 9 has a lower edge or stripping edge or plate 13.

Further, as has been drawn with cage 3, the floor 14 is pivotable about a pivot 15 and is kept in its downwardly swept position, for instance by means of an unshown retention member. The end of the floor 14 engages a weakly tilting side part of a gutter 16 on which an egg removal belt 17 rests. The gutter portion 16 is mounted around the standing pipe 9 and eggs can easily roll around these standing pipes toward the belt 17 from where they can be removed, possibly at predetermined times.

The standing pipe 9 is repeated at regular intervals in the longitudinal direction of the battery in order to keep the distances between the fodder supply locations small. By reason of this the chains 8 need not to move fast and is nevertheless obtained that the fodder is hardly "picked out" (which means deprived of its best tasting components) when the point is reached where the next supply is present. When applying the invention this is attained without necessitating unusual or excessive velocities.

Therefor it is possible to fodder the animals many times (for instance 10 times a day) with a small automation. This means that they will not be bored during such long periods as often is customary and that they get already new fodder before strong hunger feelings have developed. Also repeatedly supplying smaller portions has proved to be favourable for the food resorbtion which means that the profit of a predetermined quantity of fodder is more favourable.

In FIG. 2 also a water conduit 21 has been shown with a transverse tube 23, which may bear water nipples 22. Of course mostly a transverse tube will also protrude in the other direction and one has with each cage story at least one such water conduit 21. For adaption to the size of the animals the water conduit as well as the fodder gutter may be vertically adjustable. With cages the water conduit tube such as 23 does not give rise to problems, because it protrudes between the grating, so that the cages can be removed without much ado.

Figure 3:
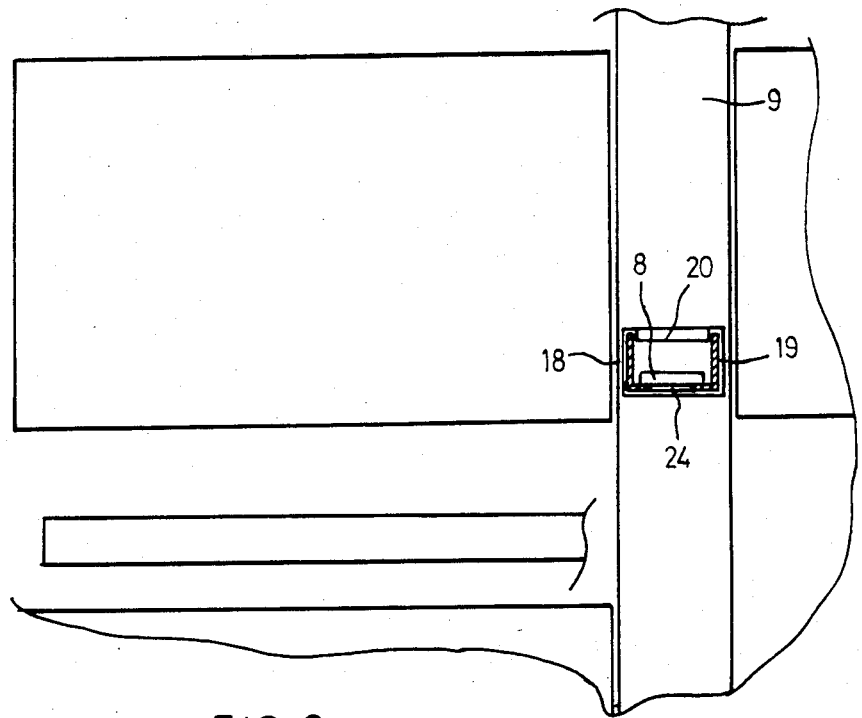
FIG. 3 shows a corresponding cross-section through another embodiment.

The embodiment of FIG. 3 concerns a considerably narrower embodiment of the service system. This embodiment is preferably used for broilers. Then the mounting of an egg's removal belt is superfluous and can be done with a narrower fodder gutter, because broilers show less tendency to throw fodder at the other side over the gutter, than do grown-up hens. If this would be desired, however, also here outside the standing pipes a broadening corresponding to 6 in FIG. 2 can be applied.

In FIG. 3 the gutters 19 are mounted in holes 18 in a standing pipe 9 and chains 8 run in the gutters 19. Further a stripping edge has been shown corresponding to that of FIG. 2 but indicated with 20. Because the water supply conduit may be relatively thin it can be mounted outside the standing pipes. At the location of the standing pipes passway openings 24 have been made in the gutters 19. Therewith the chains 8 have to be of a type that is provided with openings. This means that the standing pipes 9 not only supply fodder to the fodder gutter, but also let it pass downwardly, as is also the case with the embodiment of FIG. 2.

A further advantage of the cages according to FIG. 2 is, that they are suitable for broilers as well as laying-hens. This is attained by the tilting floor 14 which can be fixed in horizontal position or in the shown tilting position.

Further the water supply conduits 21 with transverse conduits 23 as well as the fodder gutters such as 6 and 19 may be adjustable in height position, wherewith then of course the pipes 9 are mounted such that they can move vertically along, so that it is possible always to supply water and fodder to the animals, for instance broilers, at a height matched to their body size.

In order to obtain therewith further adaption to the size of the animals, the water conduit tubes 23 may protrude through spaces in the gratings which at their lower side are narrow and broader at higher levels. Then small chickens cannot escape at the lower side, but after growing up or when the cage is used for laying-hens, they will too broad to go through the higher portions of the spaces, when they can attain them.

In FIGS. 2 and 3 it has not been shown that the cages such as 3 are part of a cage set, but this is of course so. As has been shown in FIG. 1 such a cage set can have been provided with riding means, such as so called piano wheels, but it is also possible to convey the cages on chariots suitable for the purpose, when they are ridden therebelow and have been lifted a little.

The supply of fodder to the standing pipes 9 can take place with any means, for instance a tube conveyor as has been shown schematically at the upper side of FIG. 1. Also it is possible to provide the pipes 9 at their lower side with an exit possibility, for instance for cleaning purposes.

It will be clear that the invention in principle is not only suitable for batteries for poultry, but in all cases in which animals are kept in cages.

With the invention the cage 1, 3 and 4 will have partition walls at regular intervals, so that they can be removed as closed units. These partition walls may be mounted at a distance of for instance 120 cm, by reason of which it is possible to place two cages besides each other transversely in a truck.

As more specifically appears from FIG. 1 one needs for two sets of cages only a width corresponding to the width of these cages plus one time the width of the service system. Therewith one has from the other side an unhampered sight of the animals in the cages.

I claim:

1. An apparatus for rearing and/or keeping animals, said apparatus comprising:
   a movable cage assembly comprising a plurality of cages; and
   a separate, fixedly mounted service system, adapted to cooperate with a said cage assembly when that cage assembly is moved into a position adjacent thereto, for supplying food and/or drink to the animals in the cages of the cage assembly;
   said cage assembly comprising support means, connected to the cages at only the backs thereof, for supporting said cages in vertically spaced relationship one above the other so as to define a narrow space between adjacent vertically spaced cages which is open at the front and the two sides of the cages, and
   said service system including a horizontally movable belt, separate from said cage assembly and extending in a direction substantially parallel to the front of the cages, for receiving droppings from animals in a cage located thereabove, and supporting means for supporting said belt in the said space between adjacent ones of said vertically spaced cages so that the belt can receive droppings from a said cage located thereabove.

2. Apparatus according to claim 1, in which said sets of cages include wheels.

3. Apparatus according to claim 1, in which said service system comprises a vertical central frame with two opposing main vertical sides, the said supporting means extending from both said sides for cooperation with cage sets at each side of said frame.

4. Apparatus according to claim 1, in which said service system includes a plurality of principally vertical food supply pipes and a horizontal food supply gutter for each of said vertically spaced cages, said pipes being arranged to supply food to each of the gutters and said gutters including a movable food transport means for transporting food.

5. Apparatus according to claim 4, in which said gutters include inclined side walls and a central portion therebetween, in which the movable transport means is located, the said supply pipes passing through one side wall of at least the gutters above the lowermost gutter, said supply pipes each including an opening connecting the pipe to the associated gutter, said apparatus further including a product removal belt located beside the supply pipes.

6. Apparatus according to claim 4, in which said gutters pass through said supply pipes and wherein the transport means include openings and the gutters have openings at the location of the supply pipes.

7. Apparatus according to claim 1, further comprising means for pivotably mounting the floors of the cages about an axis located at the back side of the cages.

8. A service system for use with movable cage assemblies comprising a plurality of vertically stacked, vertically spaced cages, said service system comprising at least one vertical side, horizontally extending feeding means, and a plurality of substantially vertical supply pipes for supplying food to said horizontally extending feeding means, said feeding means comprising horizontal gutters extending parallel to said vertical side including moving means for transporting food along the gutters, and said system further comprising excrement removal belts and supports for supporting said excrement disposal belts for movement, said supports extending perpendicular to said vertical side.

9. Service system according to claim 8, in which said service system includes two opposing sides, each having excrement disposal belt supports extending therefrom.

10. Service system according to claim 8, in which the gutters each comprise a central portion, in which a drivable transport means is disposed, and a pair of inclined side walls at the sides of said central portion, said vertical supply pipes being located in the region of one of said inclined side walls and including openings for passing food to the associated gutter.

11. Apparatus according to claim 8, in which said gutters cross said supply pipes and include an opening therein at the locations of said crossings, the transport means in the gutters being pervious to food.

12. Apparatus according to claim 8, further comprising product removal belts located beside the supply pipes.

13. A method for rearing and/or keeping animals such as poultry, small fur bearing animals, rabbits, piglets or the like in cages, said method comprising putting the animals in the cages of a cage assembly comprising a plurality of substantially rectangular cages located one above the other in vertically spaced relationship wherein the cages are connected to each other only at one side and wherein a space is provided between two cages located one above the other, moving the cages into a cooperative arrangement with a service system including a plurality of belts supported therefrom so that the belts are located in the spaces in between the vertically spaced cages so as to enagle removal of the excrement produced by the animals in the cages, moving the assembly of cages to a disposal station for disposing of the animals in the cages, cleaning the cages, putting a new supply of animals in the cages and again moving the cages into said cooperative relationship with the service system.

14. A method according to claim 13 wherein said method comprises a plurality of mainly rectangular cases located above each other, in which said cages are only connected to each other at one side and in that a space between two cages located above each other is present, which space is free at the three other sides of the cages.

* * * * *